United States Patent [19]
Lecuyer

[11] Patent Number: 5,129,309
[45] Date of Patent: Jul. 14, 1992

[54] ELECTRO-OPTIC TARGETING SYSTEM

[75] Inventor: John Lecuyer, Crystal Lane, Ill.

[73] Assignee: Recon/Optical, Inc., Barrington, Ill.

[21] Appl. No.: 583,814

[22] Filed: Sep. 17, 1990

[51] Int. Cl.⁵ ............................................. F41G 1/033
[52] U.S. Cl. .................... 89/41.06; 89/41.05; 89/41.21; 89/41.22
[58] Field of Search ............... 89/41.06, 41.19, 41.21, 89/41.22, 41.05, 41.17; 33/235

[56] References Cited

U.S. PATENT DOCUMENTS

| | | | |
|---|---|---|---|
| 3,007,051 | 10/1961 | Amara et al. | 89/41.21 |
| 4,019,422 | 4/1977 | Magnuson | 89/41.12 |
| 4,020,324 | 4/1977 | Buscher et al. | 89/41.21 |
| 4,093,357 | 6/1978 | Jacobson et al. | 350/338 |
| 4,231,641 | 11/1980 | Randin | 350/357 |
| 4,528,891 | 7/1985 | Brunello et al. | 89/41.21 |
| 4,592,654 | 6/1986 | Girauit et al. | 89/41.06 |
| 4,777,861 | 10/1988 | Lecuyer et al. | 89/41.17 |
| 4,902,108 | 2/1990 | Byker | 350/357 |

FOREIGN PATENT DOCUMENTS

3047958 7/1982 Fed. Rep. of Germany ..... 89/41.06

OTHER PUBLICATIONS

CAI CA-562 Technical Description, pp. 1.1–2.13.

Primary Examiner—Stephen Johnson
Attorney, Agent, or Firm—Allegretti & Witcoff, Ltd.

[57] ABSTRACT

An electro-optic targeting system for use with a surface-to-air or air-to-air missile launching system is disclosed. The targeting system provides, in a head-up display type system, the capability of sight observation of a target object and video observation of the target object, including magnified visible and thermal spectrum video, in combination with the display of an aiming mark indicating alignment of the weapon system. The targeting system incorporates a combining glass assembly through which the gunner observes the target object and upon which the video image is displayed. The combining glass includes an optically variable density cell of selectively changeable opacity. When the targeting system is operated in a sight mode, the cell is substantially clear, enabling the gunner to see the aiming mark superimposed on the combining glass with sight observation of the forward scene. When the gunner selects video mode, the cell turns opaque, blocking out the forward scene, and permitting a video signal, normal or magnified, to be reflected off the combing glass towards the gunner. In video mode, the gunner sees a video image of the target with the aiming mark superimposed. The cell automatically changes opacity when the gunner selects sight mode or video mode.

20 Claims, 4 Drawing Sheets

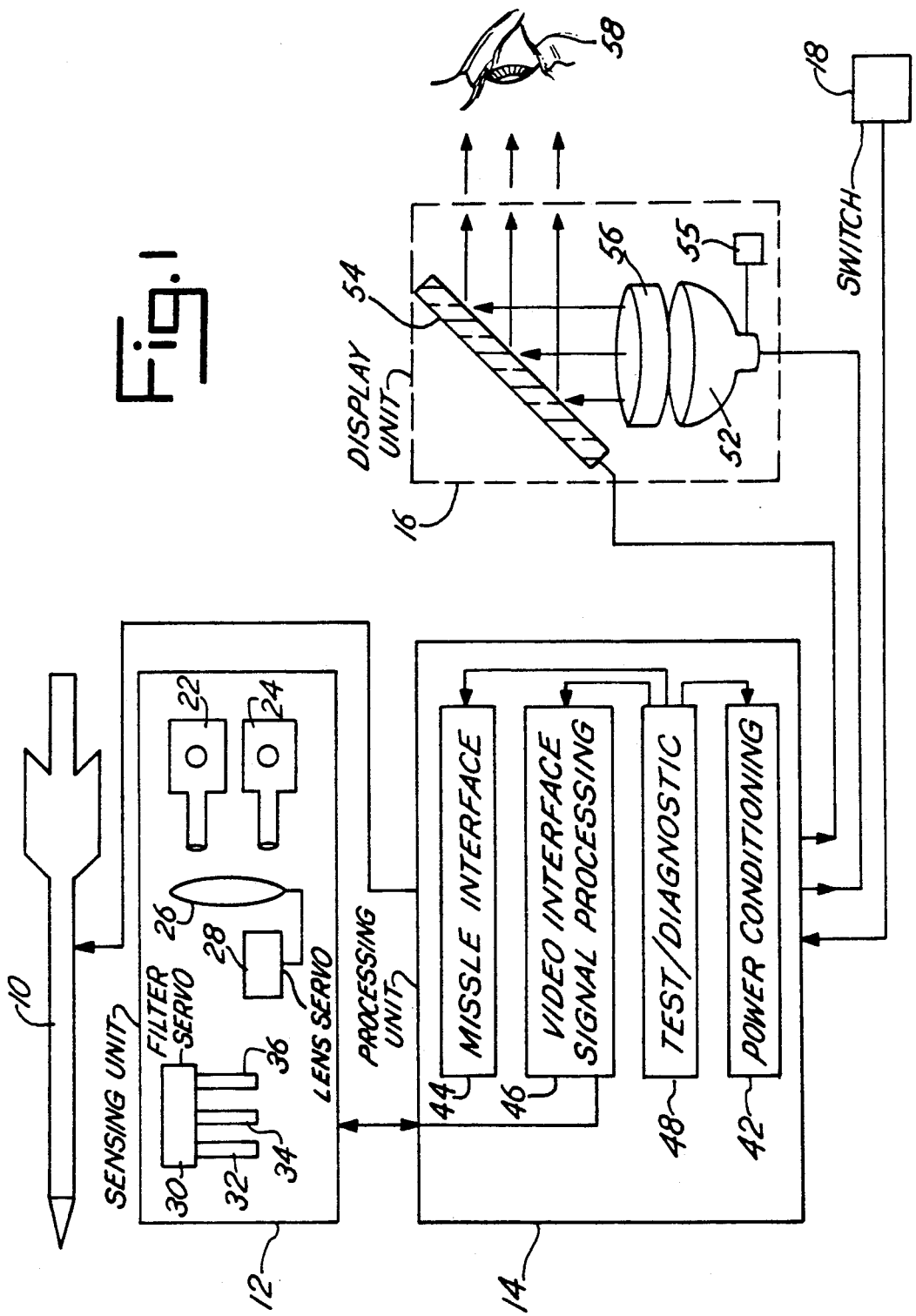

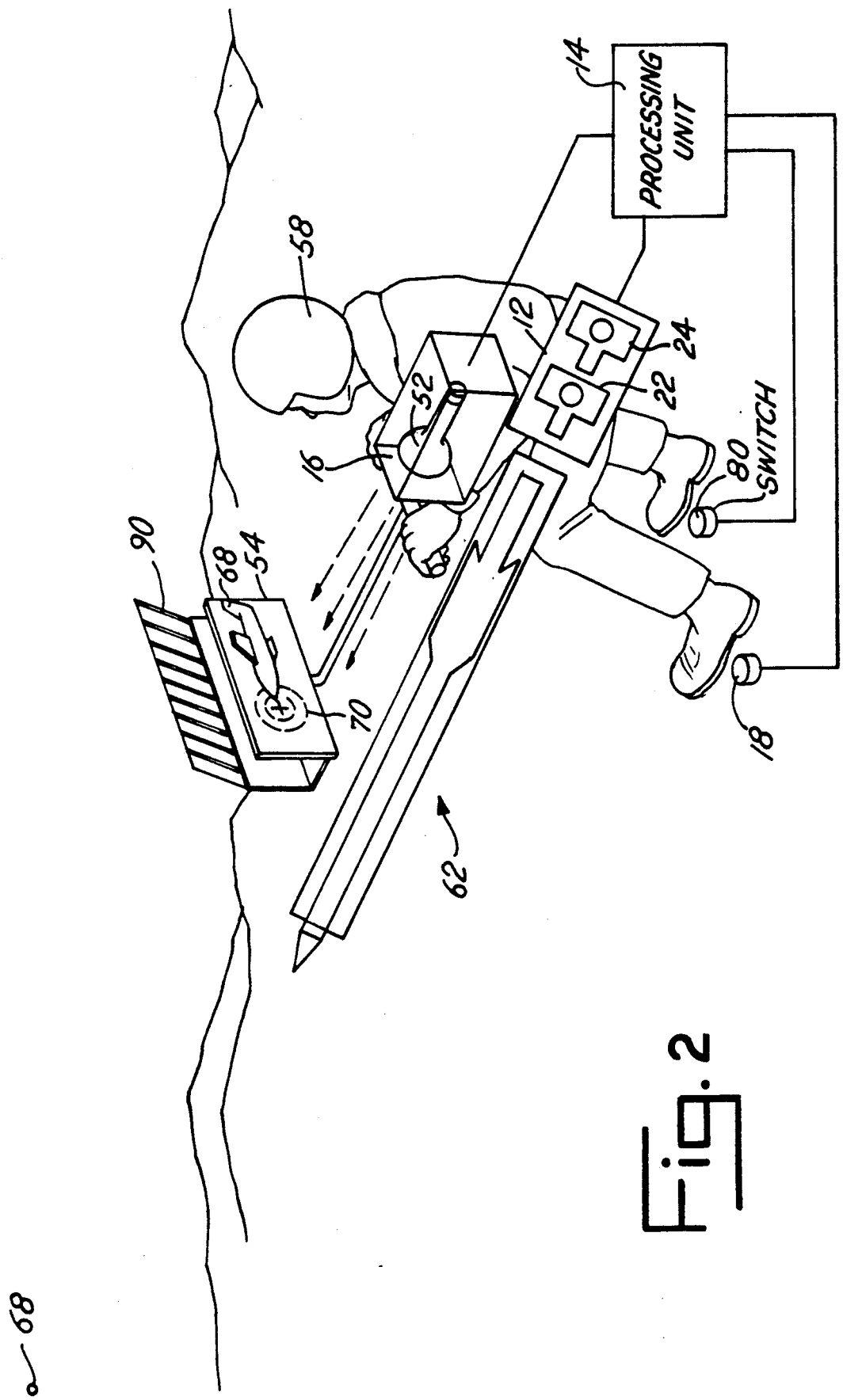

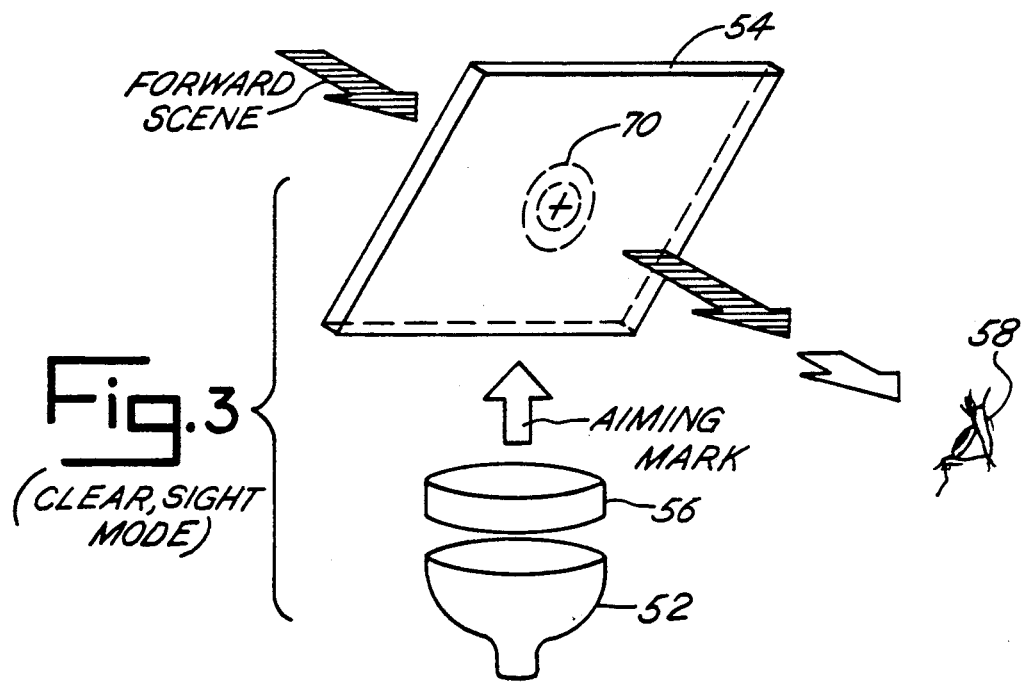
Fig.3 (CLEAR, SIGHT MODE)
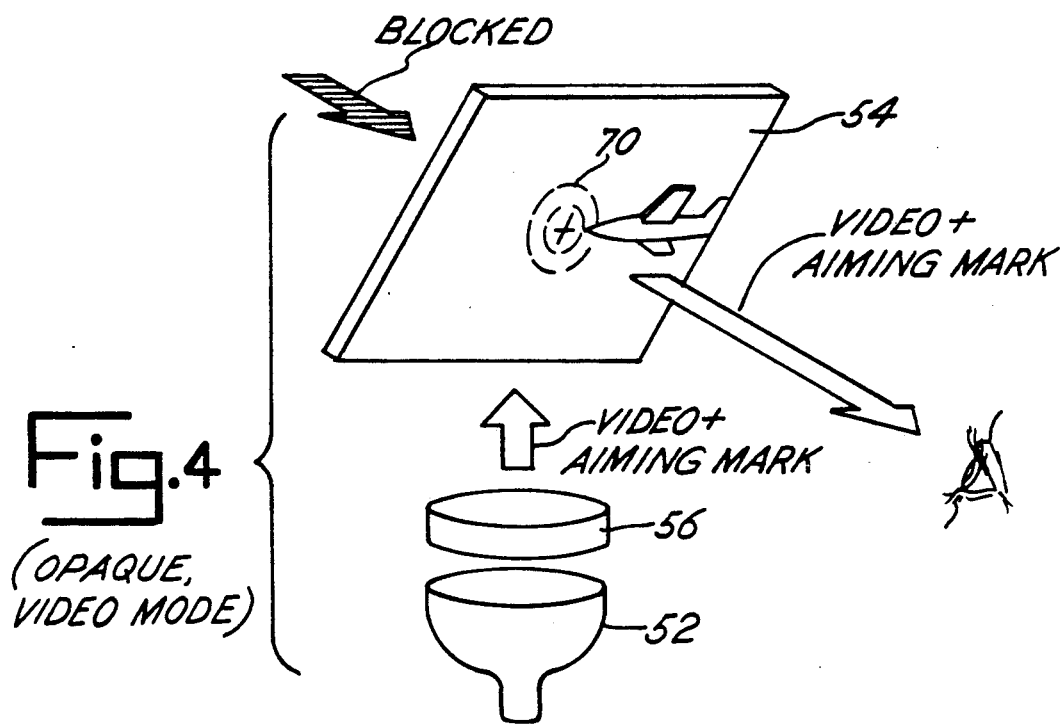
Fig.4 (OPAQUE, VIDEO MODE)

ELECTRO-OPTIC TARGETING SYSTEM

BACKGROUND OF THE INVENTION

A. Field of the Invention

This invention relates generally to targeting systems for coordinating the orientation or alignment of a weapon system, such as a surface-to-air or air-to-air missile launching system, with the gunner's observation of a target object such as a hostile aircraft. More particularly, this invention relates to an electro-optic targeting system that permits the operator to selectively change the targeting system from a sight mode, where the operator observes the target object itself, to a video mode, where a video image (visible or thermal spectrum) of the target object is observed. The video image may include a magnified video image. Even more particularly, the present invention relates to a novel design for a combining glass assembly for such a targeting system, through which the gunner observes the target object in sight mode and upon which the video images is projected in video mode.

B. Description of Related Art

As developements in military aircraft performance and air-to-ground weaponry increase, weapons systems that defined against them must also be improved. Experience and common sense dictate the the effectiveness and performance of any surface-to-air or air-to-air weapon system critically depends on the ability of the operator of the weapon system to detect, identify, and target hostile aircraft. The purpose of a targeting system is to provide the capability to detect, identify and target the hostile aircraft, and thus the targeting system is a crucial component in any sophisticated weapon system.

Targeting systems generally fall into two categories, head-up displays and head-down displays. Head-down displays are displays separated from the operator's sight observation, where a thermal, magnified optical, or electro-optic image of the target object is displayed. Head-up displays provide bore sight indication in the operator's line of sight to the target object.

In recent years, head-up displays have been developed to permit the projection of an aiming mark indicating the point of regard of the missile onto a combining glass through which the scene is viewed, thus confirming target acquistion. The operator sees the target scene through the combining glass with the aiming mark superimposed. In addition to the aiming mark, other information such as missile status and conditions are simultaneously displayable on the combining glass. Typically, a cathode ray tube is used to project this information onto the combining glass.

Another head-up display system, used in military aircraft, is called the LANTIRN (Low Altitude Navigation Targeting Infra-Red Night) system. This system presents the pilot of his head-up display with a video presentation of a thermal image of the target object superimposed and perfectly coincident with the view of the target object through the windscreen.

Although head-down, magnified optical or electro-optical systems have been popular in air defense applications, experience has shown that head-up systems are more effective targeting systems. Indeed, it has been shown that a gunner operating in a head-up environment can detect a random target up to 500 times faster than in a head-down environment, due to the nature of the human eye and optical limitations inherent in head-down systems.

However, heretofore, head-up display targeting systems have lacked the capacity for magnified display of the target object. The capability of magnification greatly enhances the performances of a weapon system, since detection and identification occur at an earlier point in time, allowing the gunner more time to ready (uncage) the weapon, take aim and fire. A conventional approach using lenses and other hard optics in a head-up display is unacceptable due to bulk and complexity. A further complication is the confusion and discomfort which results from the superposition of a magnified image onto the unmagnified target image. The present invention overcomes these problems and limitations of the prior art.

It is thus an object of the present invention to provide a targeting system for a weapon that provides in a head-up display the capability of displaying a magnified image of the target object without the simultaneous observance of the unmagnified forward scene.

It is a further object of the present invention to enhance and improve the performance of a weapon system by providing mangification to a head-up display targeting system, thereby reducing the time it takes to detect, identify and target hostile aircraft.

It is an additional purpose and object of the present invention to provide a combining glass assembly for a targeting system that selectively alternately permits sight observation of the target object and video observation of the target object, including magnified visible spectrum and magnified thermal spectrum video observation, in conjunction with the display of the aiming mark of the weapon.

A still further object of the invention is to provide a combining glass assembly for a targeting system that is selectively alternately changeable from a clear state to an opaque state, thereby permitting sight observation in the clear state and video observation in the opaque state, where the forward scene is blocked out when the combining glass assembly is in the opaque state.

SUMMARY OF THE INVENTION

These and other objects, advantages and features of the present invention are achieved by providing, in combination with a weapon system, an electro-optic targeting system for displaying a target object coincident with an aiming mark indicating the alignment of the weapon system. The targeting system comprises a sensing means for sensing the target object and for generating a video signal of the object, a processing means for coordinating the alignment of the weapon system with the sensing means, a display means for displaying the video signal of the object and an aiming mark indicating alignment of the weapons system, and a switch for selectively changing the display means from sight mode to video mode.

The display means includes a combining glass assembly alternately changeable to be in an opaque state and a clear state, and a means for projecting the video signal onto the combining glass assembly. The display means is selectively operable by the switch to alternate between a sight mode in which the combining glass assembly is in a clear state permitting sight observation of the target ojbect, and a video mode in which the combining glass is in an opaque state, blocking sight observation of the target object, and permitting video observation of the target object. A cathode ray tube is used to project the aiming mark and video image onto the combining glass assembly. When the display means is in the video mode, the video signal of the object is displayed on the combining glass, permitting a magnified video image of the object to be produced on the combining glass assembly with the aiming mark, thereby enhancing performance of the weapon system.

In the preferred embodiment of the invention, the combining glass assembly comprises an optically variable density cell of selectively changeable opacity. The optically variable density cell can be made out of numerous possible materials and substances. In the preferred embodiment, an electro-chromic variable density filter which changes opacity by application of a potential difference to the cell is used. The electro-chromic variable density filter is disposed between front and rear glass (or glass-like) surfaces which have reflective coatings applied to the exterior surfaces.

The present invention provides a quantum evolutionary improvement in the performance of targeting systems and the weapon systems that depend upon them, and provides for an extended detecting range, extended identification range, and extended duration of target acquisition. Lost time is reduced and the time available to the gunner to prepare for a successful engagement is increased. To accomplish these results, the present invention allows the gunner to point the sensing means at the target object, then, by a flick of the switch, change from a non-magnified sight mode to a magnified (electro-optic) video mode. Prevailing atmospheric conditions will dictate which electro-optic sensor to utilize: thermal spectrum for very hazy or foggy conditions, visible spectrum for other conditions. Once the target has been acquired in the video mode, the gunner can select higher power magnification in video mode, enhancing identification and targeting.

BRIEF DESCRIPTION OF THE DRAWINGS

The features, advantages, and objects of the present invention can be more completely understood by reference to the following detailed description of preferred and alternative embodiments and by reference to the accompanying drawings, in which FIG. 1 is a block diagram of the targeting system of the present invention in combination with a weapon system;

FIG. 2 is an illustration of the targeting system of FIG. 1 operating in video mode showing the display on the combining glass assembly of a magnified video image and an aiming mark;

FIG. 3 is an illustration of the function of the combining glass assembly of the targeting system of FIGS. 1 and 2 when the targeting system is in sight mode;

FIG. 4 is an illustration of the function of the combining glass assembly of the targeting system of FIGS. 1 and 2 when the targeting system is in a video mode.

DETAILED DESCRIPTION OF THE PREFERRED EMBODIMENT

Figure 5:
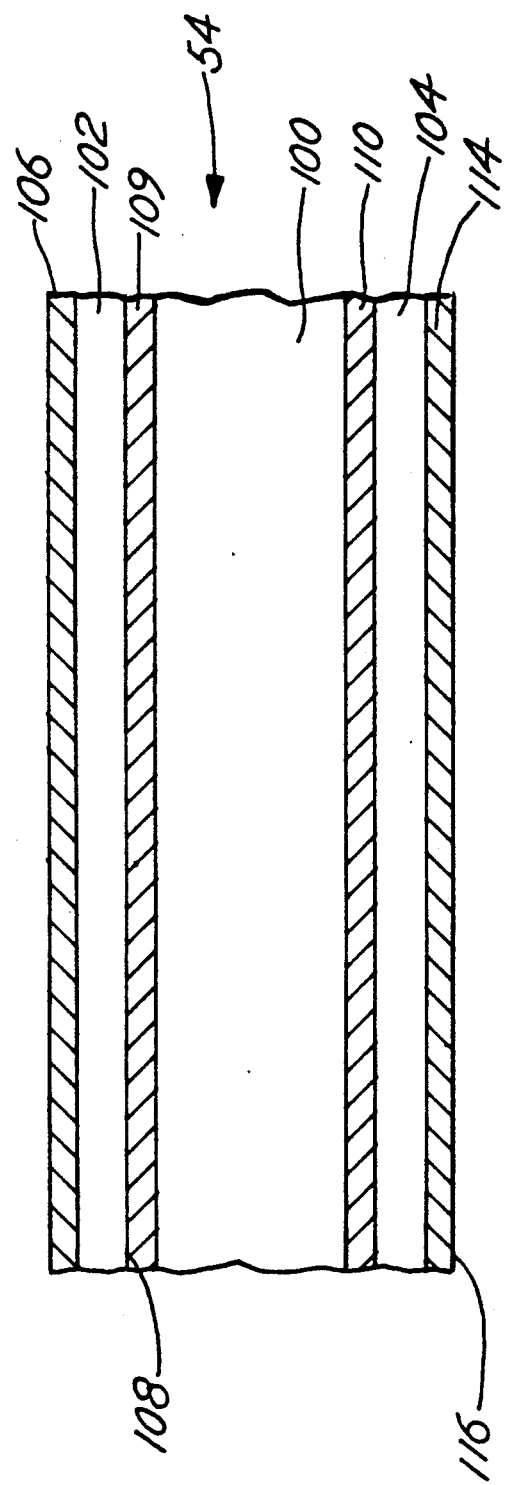
FIG. 5 is an isolated cross-sectional view of the combining glass assembly of FIGS. 1-4 in the preferred form of the invention.

The targeting system of the present invention is shown in block diagram form in FIG. 1. The targeting system is shown in conjunction with a generic weapon system 10, which may be a surface-to-air or air-to-air missile launching system. The targeting system generally comprises a sensing means 12 for sensing a target object and for generating a video signal of the target object, a processing unit 14 for coordinating the alignment of the sensing means 12 with the weapon system 10, a display means 16 (dashed lines) for displaying the video signal and an aiming mark indicating alignment of the weapon system 10, and a switch 18 that selectively alternately changes the display means from video mode to sight mode.

The sensing means 12 includes a high resolution, solid state electro-optic video camera 22 which has an integral automatic exposure control feature. The sensing means further includes a means for producing a thermal image video signal, such as a forward looking infra-red (FLIR) camera 24. Also included in the sensing means 12 is a dual field of view objective lens 26, an objective field of view servo mechanism 28 for changing the field of view lens 26, and a filter disc drive servo 30. The disc drive servo 30 carries three filters, 32, 34 and 36. Filter 32 is clear, filter 34 is infrared blocking (blue-green) and filter 36 is infra-red enhancing (red). The gunner uses the filters to improve image clarity. The electro-optic video camera 22 is contained in a weatherproof housing (not shown in FIG. 1) and is mounted on a bore-sight adjustable mount, to permit alignment with the infra-red camera 24, laser range finder (not shown in FIG. 1) and the weapon system 10.

The processing unit 14 is a self-contained electronic processing unit which contains the power conditioning circuits 42, missile system interface circuits 44, thermal and video camera interface and signal processing circuits 46, and the test and diagnostic circuits 48. The processing unit is enclosed in a weatherproof enclosure. The details of the processing unit's missile interface circuits, signal processing circuits and other associated circuits are well known to those of oridinary skill in the art, and the implementation of the processing unit is according to standard techniques.

The display means 16 contains a cathode ray tube 52 and amplifier and associated supply circuits 55. The cathode ray tube 52 projects the video image (in video mode) and an aiming mark indicating the alignment of the weapon system (in sight and video modes) onto a combining glass assembly 54. An objective lens 56 focuses the aiming mark and video image onto the combining glass assembly 54.

The gunner 58 sees the aiming mark on the combining glass assembly 54 and sees the target object in sight mode through the combining glass assembly 54, or, by activating the switch 18, a video image of the target object of the combining glass assembly 54.

Referring now to FIG. 2, the gunner 58 is shown operating a surface-to-air missile launching system 62. The point of regard of the missile is electronically supplied to the processor unit 14. The electro-optic video camera 22 and thermal imaging camera 24 are housed in sensor unit 12. When the gunner spots an object such as an aircraft 68, he maneuvers the weapon system (surface-to-air missile launching system 62) to a position such that the aircraft 68 is generally coincident with an aiming mark 70 projected by the cathode ray tube 52 in the display unit 16 onto the combining glass assembly 54. The gunner 58 switches with his left foot the switch 18, thereby changing the display means from being in sight mode to video mode as illustrated in FIG. 2. The combining glass assembly 54 automatically changes from a clear state to an opaque state, blocking out the forward scene, and permitting a video image of the aircraft to be seen on the combining glass assembly 54.

By activating a second switch 80, the gunner can narrow the field of view and select a magnified image to be displayed on the combining glass assembly, as when switch 80 is activated the objective field of view servo mechanism 28 changes the field of view lens 26 (FIG. 1).

As a backup to the targeting system in the event the combining glass assembly 54 does not change opacity, a mechanical shutter 90 is provided which would be open when the display means is in sight mode and closed in video mode. The shutter can be manually operable, or can have an electric motor to open and close the shutter 90 in response to the opening and closing of the switch 18.

Referring now to FIG. 3, the combining glass assembly 54, cathode ray tube 52 and objective lens 56 are shown isolated, showing the operation of the combining glass assembly 54 when the operator has switched the display means to sight mode. The combining glass assembly 54 is in a substantially optically clear state in sight mode. The forward scene, which includes the target object, is incident upon the combining glass assembly from the left (striped arrow). The cathode ray tube projects the aiming mark through the objective lens, where it is reflected off the combining glass assembly 54. The gunner 58 sees displayed on the combining glass assembly 54 the aiming mark 70 superimposed on his sight observation of the forward scene (striped arrow).

FIG. 4 illustrates the combining glass assembly 54, cathode ray tube 52 and objective lens 56 again isolated, showing the operation of the combining glass assembly 54 when the gunner has switched the display means to video mode. On activation of the switch 18 (FIG. 1 and 2), the combining glass assembly 54 turns opaque, blocking out the forward scene (striped arrow). The video signal of the target object is projected, along with the aiming mark, through the objective lens 56 onto the combining glass assembly 54, where it is reflected towards the gunner 58. The gunner 58 can selectively change the video projection from visible spectrum video to thermal spectrum (infrared) video, depending on prevailing atmospheric conditions.

Referring now to FIG. 5, a preferred form of a combining glss assembly 54 is shown in cross section. The assembly generally comprises an optically variable density cell of selectively alternately changeable opacity 100 disposed between front 102 and rear 104 glass (or glass-like) surfaces. The front glass surface 102, upon which the forward scene is incident, has a very low reflective coating 106 on its exterior surface which blocks out UV light, thereby improving performance by eliminating the portion of the spectrum that causes eyestrain without improving vision. On the interior surface 108 of the front glass surface 102 is an electrode 109 which is elevated to an electrical potential when the combining glass assembly 54 is operated in video mode, thereby energizing the cell and turning the cell opaque.

The optically variable density cell 100 in the preferred embodiment in an electro-chromic solution phase variable density filter of the type disposed in U.S. Pat. No. 4,902,108, issued to Byker, and assigned to Gentex Corporation. The solution, when energized, changes from optically clear to optically opaque in approximately 2.0 seconds, and from opaque to clear in under 5.0 seconds. The cell 100 may be a single layer cell, or may have multiple layers that become energized and change opacity in concert.

The rear glass (or glass-like) surface 104 has an electrode surface 110 on the interior surface which is either maintained at the electrical potential of the electrode on the front glass surface (in shigh mode) or is held at different potential in video mode, enabling the cell to become energized and change opacity.

To provide a high contrast between the aiming mark and the forward scene, a holographic reflective coating 114 is applied to the rear glass surface 104 on its exterior surface 116. The holographic reflective coating 114 provides greatest reflectivity with the wave length of the cathode ray tube phosphor, while blocking 100% percent of that wave length (color) from the forward scene. Because the blocked color line is that of the cathode ray tube, scene discoloration is virtually imperceptible. The relative thickness of the reflective coatings and electrodes are exaggerated in FIG. 5 to more clearly illustrate the construction of the combining glass assembly.

While an electro-chromic variably density filter is preferred for the optically variable density cell 100, other choices for the material or composition of the cell may be used. Those of ordinary skill in the art will appreciate the liquid crystal, photo-chromic, photo-electro-optical, photo-electro-chemical, photo-voltaic, photo-conductive, Brownian effect, or other types of variable density cells may be used. It has already been noted that a mechanical shutter will suffice. The only criteria is that they are selectively changeable to be in a clear (transparent) state or an opaque (non-transparent) state depending on whether the display means is operated is sight mode or video mode. Additionally, it may be possible to construct a combining glass assembly according to the teachings disclosed herein in which the optically variable density cell is physically separated from the combining glass upon which the video signal is projected, but the operation of the targeting system remains fundamentally uncharged. Additionally, other highly reflective coatings can be applied to the rear exterior surface of the combining glass assembly to provide mirror-like reflection of the video signal. The true spirit and scope of the present invention as defined in the appended claims and their equivalents is intended to cover such alternative constructions to the preferred embodiment disclosed herein.

I claim:

1. In combination with a weapon system, a targeting system for displaying an image of a target object coincident with an aiming mark indicating the alignment of said weapon system, comprising in combination:

sensing means for sensing said target object and for generating a video signal of said object;

processing means for coordinating the alignment of said weapon system with said sensing means;

display means for displaying said video signal of said object and said aiming mark, said display means including a combining glass assembly changeable to be in an opaque state or a clear state and a means for projecting said video signal onto said combining glass assembly, said display means being selectively operable between a sight mode in which said combining glass assembly is in said clear state permitting sight observation of said target object and a video mode in wich said combining glass assembly is in said opaque state blocking sight observation of said target object and permitting video observation of said target obejct; and switch means for selectively alternately changing said display means from said sight mode to said video mode;

whereby said video signal of said target object and said aiming mark are projected onto said combining glass assembly when said display means is in said video mode, enhancing performance of said weapon system.

2. The targeting system of claim 1 wherein said sensing means further comprises a means for generating a magnified video signal of said target object.

3. The targeting system of claim 1 wherein said display means further comprises a mechanical shutter and said combining glass assembly changes from said clear state to said opaque state by closing said mechanical shutter.

4. The targeting system of claim 1 wherein said combining glass assembly comprises an optically variable density cell of selectively changeable opacity.

5. The targeting system of claim 4 wherein said optically variable density cell comprises at least one layer of material of changeable opacity disposed between front and rear glass surfaces.

6. The targeting system of claim 5 wherein said layer of material of changeable opacity comprises an electro-chromic variable density filter which changes opacity by application of a potential difference to said cell.

7. The targeting system of any one of claims 1-6 wherein said sensing means includes means for producing a thermal image video signal of said target object for display by said display means.

8. The targeting system of claim 1 wherein said means for projecting said video signal comprises a cathode ray tube.

9. The targeting system of claim 1 wherein said weapon system is a surface-to-air missile launching system.

10. A targeting display system for observing a target object and an aiming mark indicating the alignment of a weapon comprising:

cell means for changing between an optically clear state permitting sight observation of said target object and an optically opaque state blocking sight observation of said target objet;

switch means for switching said cell means between said clear state and said opaque state; and means for enabling said aiming mark to be displayed on said cell means and for enabling a video image of said target object to be displayed on said cell means when said cell means is in said opaque state, whereby said video image of said target object can be observed without simultaneously observing said target object.

11. The display system of claim 10 wherein said cell means comprises and electro-chromic variable density filter.

12. The display system of claim 10 wherein said cell means comprises a photo-chromic variable density filter.

13. The display system of claim 10 wherein said cell means comprises a liquid crystal variable density filter.

14. The display system of claim 10 wherein said cell means comprises a photo-electro-optical variable density filter.

15. The display system of claim 10 wherein said cell means comprises a photo-voltaic variable density filter.

16. The display system of claim 10 wherein said cell means comprises a photo-conductive variable density filter.

17. The display system of claim 10 wherein said weapon is a surface-to-air missile.

18. The display system of claim 10 wherein said means for enabling comprises means for generating said video image of said target and for projecting said video image onto said cell means.

19. The display system of claim 18 wherein said cell means further comprises a rear glass surface and a front glass surface and wherein said rear glass surface has applied thereto a reflective coating of greatest reflectivity in the wave length of said projected video image of said means for generating.

20. The targeting system of claim 5 wherein said rear glass surface has applied thereto a reflected coating of greatest reflectivity in the wave length of said projected video signal.

* * * * *